H. REISERT.
PRESSURE FILTER.
APPLICATION FILED APR. 11, 1914.
1,165,124.
Patented Dec. 21, 1915.
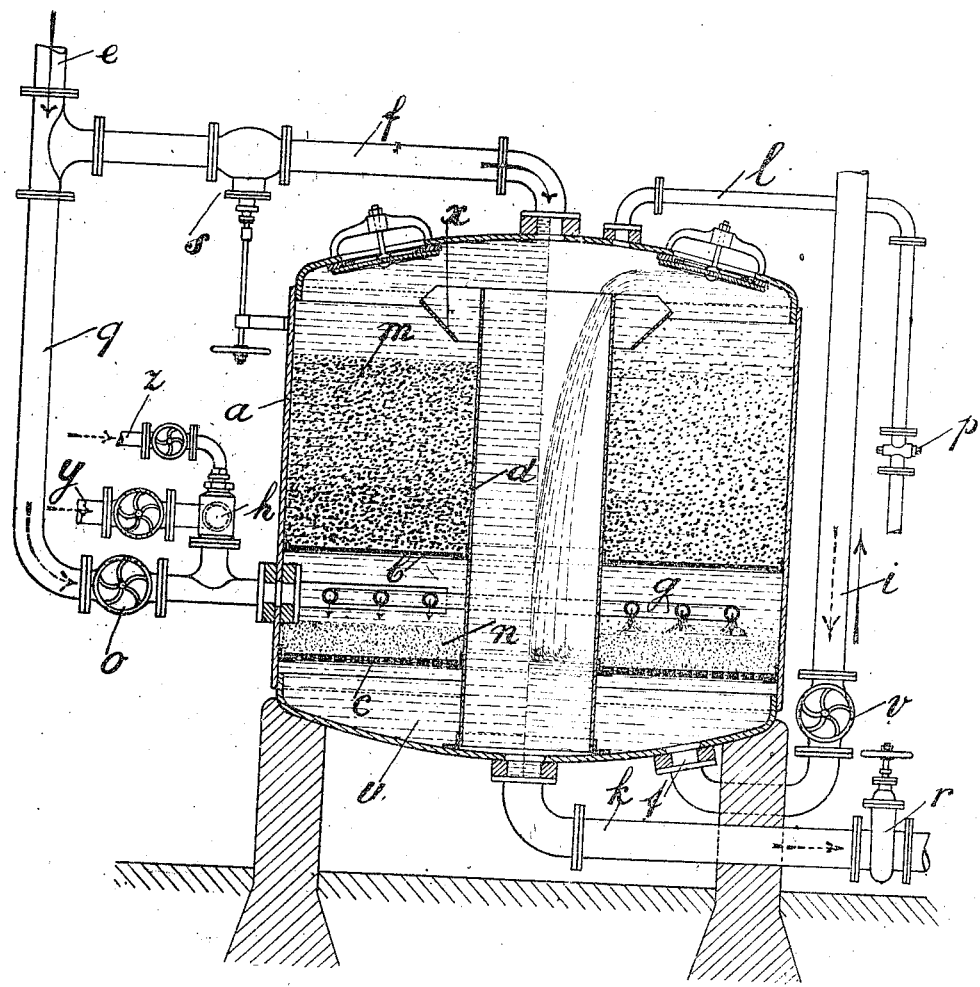

UNITED STATES PATENT OFFICE.

HANS REISERT, OF COLOGNE, GERMANY, ASSIGNOR TO REISERT AUTOMATIC WATER PURIFYING COMPANY, A CORPORATION OF NEW JERSEY.

PRESSURE-FILTER.

1,165,124.   Specification of Letters Patent.   Patented Dec. 21, 1915.

Application filed April 11, 1914. Serial No. 831,183.

*To all whom it may concern:*

Be it known that I, HANS REISERT, a subject of the Empire of Germany, and residing in Cologne, Germany, have invented certain new and useful Improvements in Pressure-Filters, of which the following is a specification.

The object of this invention is to provide a filter having primary and secondary, or coarse and fine, filter beds, with the advantages which such a construction possesses, and wherein the filter material is washed out in part by raw water and in part by purified water, in such manner that only purified water is forced through the secondary bed whereas the primary bed is washed out by the combined wash-waters.

A further object is to discharge the raw wash-water over the secondary bed in such manner as to agitate and open up the upper surface thereof, to assist the washing out of its material.

It is also an object to enable the surface of the secondary bed to be acted upon in a similar manner by streams or jets of air prior to washing.

With these ends in view the invention may be said to comprise the features of construction and combinations of parts hereinafter described with reference to a preferred illustrative embodiment, and more particularly pointed out in the appended claims.

The accompanying drawing illustrates the said embodiment in vertical section.

The construction shown is a pressure filter. It comprises a tightly closed chamber or tank $a$, of suitable form, containing primary and secondary filter beds $m$, $n$ supported on perforated shelves $b$, $c$. The primary bed is illustrated as of relatively coarse material and the secondary bed of relatively fine material, the secondary bed being of materially less depth than the primary bed. In the filtering operation, raw water to be filtered is supplied over the primary bed and passes first through this bed and then through the secondary bed, the two beds being in series relation. The raw water arrives under pressure through the pipe $e$, and is admitted to the inlet over the bed $m$ through the branch pipe $f$. This pipe is controlled by a valve $s$. The outlet for purified water is indicated at $t$ at the bottom of the tank, and is in communication with a stand-pipe $i$ of appropriate height. This outlet is controlled by a valve $v$. In the upper part of the tank, above the primary bed, there is also an air vent pipe $l$ having a valve $p$.

A down-take pipe $d$, of large area within the tank, and a sludge pipe $k$, leading from the bottom of the tank in communication with the said pipe $d$, afford means for carrying off the wash-waters and the impurities held in suspension thereby. The pipe $k$ is controlled by a valve $r$. The pipe $d$ extends upward through both filter beds, and projects sufficiently above the primary bed to guard against the material thereof being swept away by the wash-water. In addition the upper end of this pipe may be guarded by a deflector $x$.

Beneath the perforated support $b$ of the secondary filter bed and above the bottom of the tank is a space $u$, constituting a reservoir for holding a certain quantity of the purified water, which is utilized for washing out the secondary bed. It need not, however, hold all of the purified water used in this operation.

Means are provided for forcing the purified water back through the secondary bed to cleanse the latter of accumulated impurities. In the present instance this is effected by the head, due to the column of water in the stand-pipe $i$, but other means may be employed if desired. Means are also provided for supplying raw wash-water between the beds, to mingle with the wash-water which has passed through the secondary bed, and therewith proceed upward through the primary bed, cleansing the latter. In the particular construction illustrated, a branch $q$ of the raw water pipe $e$ passes through the side of the tank and terminates in a distributing pipe $g$ between the beds and adjacent the top surface of the lower bed. This distributing pipe, which may be of any suitable formation, is provided beneath with a multiplicity of small holes, through which the emerging water is directed against the material of the secondary bed so as to loosen and agitate the same from above. The pipe $q$ is controlled by the valve $o$. Means are also provided for introducing air between the beds prior to washing. This air is directed in jets against the top of the secondary bed to loosen the same. For this purpose the distributing pipe *g* is preferably utilized, being connected with an air injector *h* having pipes *y*, *z* leading thereto and each provided with a valve, as shown. The injector may be of an ordinary form in which steam from the pipe *z* entrains air from the pipe *y*.

The left-hand half of the drawing exhibits conditions during filtering; the right-hand half during washing. During the filtering the valve *s*, controlling the raw water inlet, and the valve *v*, controlling the purified water outlet, are open. All other valves are closed. The tank is consequently full of water, which passes under pressure downward through both of the beds to the stand-pipe *i* and thence to any point or points of delivery. Before washing, the valves *s* and *v* are closed. The valve *r* of the sludge pipe *k* and the valve *p* of the air vent *l* are opened, and the water in the stand-pipe *d* and in the uppermost portion of the tank above this pipe is allowed to flow out. If air is to be used, the same is forced in by the injector *h* through the downwardly directed openings of the distributing pipe *g*, against the top of the secondary filter bed, with the result already indicated. This air passes upward through the primary bed and escapes by way of the air vent. In order to wash, the supply of air is cut off and the valves *o* and *v* are opened. By virtue of the hydrostatic head of the water in the pipe *i*, the purified water from the reservoir *u* is forced upward through the secondary bed. At the same time raw water is being discharged from the distributing pipe *g*, and, acting first downwardly upon the surface of the secondary bed, assists in washing out the latter by loosening the material. Then mingled with the water which has passed upward through the secondary bed, it flows upward through the primary bed; and the combined wash-waters finally overflow into the down-take *d* and are thence discharged through the sludge pipe. The raw water admitted between the beds is kept from mingling with the purified water beneath the secondary bed, because the pressure under which the purified water is forced backward through the secondary bed is sufficiently great to prevent the raw water emerging from the small holes of the distributing pipe *g* from passing downward entirely through the said secondary bed. Both supplies of wash-water seek the easiest way out, that is to say, through the down-take *d* and the sludge pipe *k*. To recommence filtering, the valves *o* and *r* are closed and the valve *s* is opened. Then after the air has escaped from the interior of the tank, the valve *p* of the air vent is closed and filtering proceeds as before. During washing the air vent is kept open, so that the interior of the tank is in communication with the atmosphere and the pressure therein is relieved. When the tank is filled again, to recommence filtering, the vent permits the air to escape from the interior.

It will be understood that the invention may assume various forms and is not necessarily limited to the embodiment shown.

What I claim as new is:

1. In a filter, the combination of a closed chamber containing primary and secondary beds one above the other, and having an inlet for raw water to be filtered and an outlet for filtered water in its upper and lower portions respectively, means for forcing filtered water backward through the secondary bed, means for introducing raw water for washing beneath the primary bed, and an overflow for muddy wash water comprising a tube extending vertically through the beds with its upper end above the primary bed.

2. In a filter, the combination of a closed chamber containing primary and secondary beds one above the other, and having an inlet for raw water to be filtered and an outlet for filtered water in its upper and lower portions respectively, means for forcing filtered water backward through the secondary bed and for introducing raw water for washing beneath the primary bed, an overflow for muddy wash water comprising a tube of large area extending vertically through the beds with its upper end above the primary bed, and a normally closed valved outlet communicating with the bottom of said tube.

3. In a filter, the combination of a closed chamber containing primary and secondary beds one above the other, and having an inlet for raw water to be filtered and an outlet for filtered water in its upper and lower portions respectively, means for forcing filtered water backward through the secondary bed and for introducing raw water for washing beneath the primary bed, an overflow for muddy wash water comprising a tube of large area extending vertically through the beds with its upper end above the primary bed, a normally closed valved outlet communicating with the bottom of said tube, and a valved air vent communicating with the upper portions of the chamber.

4. In a filter, the combination of a closed chamber containing primary and secondary beds one above the other, and having an inlet for raw water to be filtered and an outlet for filtered water in its upper and lower portions respectively, means for forcing filtered water backward through the secondary bed for washing, piping disposed in the space between the beds and having jet orifices directed downward upon the surface of the secondary bed, means for alternately supplying raw water and air to said piping, an overflow for muddy wash water comprising a tube of large area extending vertically through the beds with its upper end above the primary bed, and a normally closed valved outlet communicating with the bottom of said tube.

In testimony whereof, I have signed my name to this specification, in the presence of two subscribing witnesses.

HANS REISERT.